United States Patent [19]

Wilwerding

[11] Patent Number: 4,742,217

[45] Date of Patent: May 3, 1988

[54] PROJECTION ALIGNMENT AND FOCUSING AID

[75] Inventor: Dennis J. Wilwerding, Littleton, Colo.

[73] Assignee: Honeywell Inc., Minneapolis, Minn.

[21] Appl. No.: 870,065

[22] Filed: Jun. 2, 1986

[51] Int. Cl.⁴ ............................................... G08C 9/06
[52] U.S. Cl. .................................................... 250/201
[58] Field of Search ............... 250/201 AF, 578, 568, 250/201 R; 354/403; 356/4

[56] References Cited

U.S. PATENT DOCUMENTS

| | | | |
|---|---|---|---|
| 3,360,635 | 2/1967 | Wolf et al. | 250/568 |
| 3,634,696 | 1/1972 | Wildhaber | 250/568 |
| 3,809,894 | 5/1974 | Renzo | 250/568 |

Primary Examiner—Edward P. Westin
Assistant Examiner—Khaled Shami
Attorney, Agent, or Firm—Charles J. Ungemach

[57] ABSTRACT

An alignment and focusing aid to assure that a detector array receives a properly focused image from a predetermined desired area of a remote object by providing an elongated radiation source located at an optical position indicative of the location of the detector array using a partly reflective mirror in the path between the object and the array to project radiation from the source to the object so that the proper focus condition and the desired area may be adjusted by focusing and positioning the image of the radiation source on the object.

10 Claims, 1 Drawing Sheet

PROJECTION ALIGNMENT AND FOCUSING AID

BACKGROUND OF THE INVENTION

In the use of radiation detector arrays, particularly those referred to as "linear arrays" consisting of a plurality of radiation detectors such as CCD's or CID's arranged in a line, it is often difficult to determine the part of a remote object from which the detector array receives radiation. In photography, the problems is not severe since the human operator has a viewfinder which shows, at least generally, where the detector array is looking. But in many cases, such as assembly line monitoring, the system does not employ a viewfinder or a human operator is not always available to aim through a viewfinder. This problem is quite serious when the equipment must be accurately aimed at a predetermined area on the object. For example, a system might be set up to measure the width of object passing by on a conveyor belt. The object image would fall on the linear array and the number of detector elements covered by the image would then be a measure of the width. Unless the optical system is aimed quite accurately, the image of the object might extend beyond one end of the array and the system would fail. A second problem is also encountered when the system is not in accurate focus because the image on the detectors is fuzzy and the ends of the image are difficult to accurately locate. Of course, increasing the number of detector elements in the array could minimize the problem of the image extending beyond the ends of the array, but the cost of detector elements is high and this solution would still not solve the problem of focus error.

SUMMARY OF THE INVENTION

The present invention overcomes both of the problems of the prior art in a simple and economical manner. In the present invention, the optical system used to transmit the image of the remote object onto the detector array, is used in reverse to project a line of radiation onto the remote object from a position that is optically at the same distance and orientation with respect ot the object as the detector array. The optical system is adjusted until the projected line of radiation is in focus thus assuring that the image of the object on the detector array will be in focus. The system is also moved until the projected radiation is at the desired location on the object thus assuring that the desired location of the object will fall on the detector array.

DETAILED DESCRIPTION OF THE PREFERRED EMBODIMENTS

Figure 1:
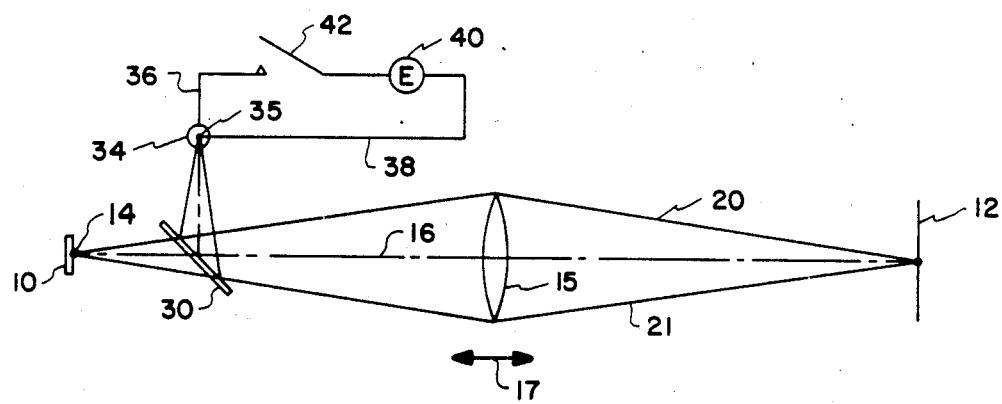
FIG. 1 shows a schematic side view of the optical system of the invention.
Figure 2:
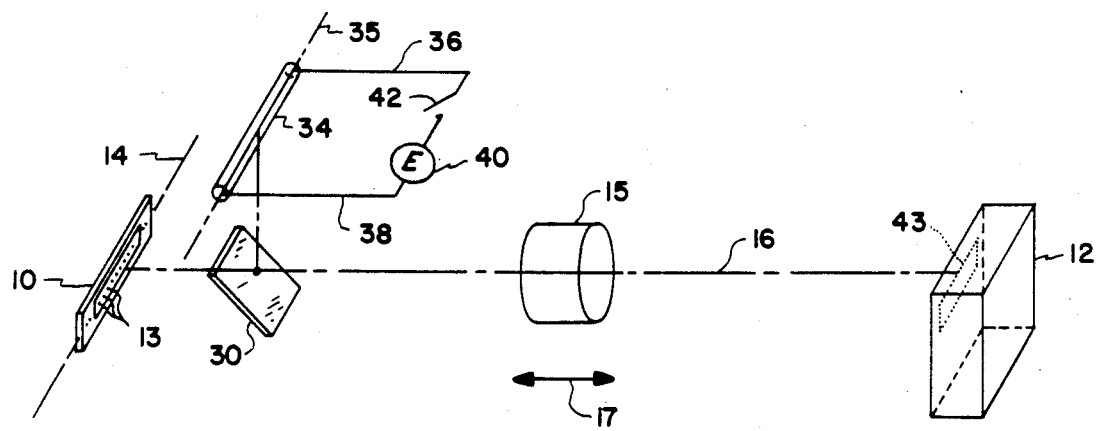
FIG. 2 shows a perspective view of the invention.

In FIGS. 1 and 2, a detector array 10 is shown positioned to recieve radiation from a remote object 12, which may be one of a plurality of items moving along a conveyor belt, for example. The array 10 is comprised of a plurality of photo sensitive detector elements 13 such as CCD's in a line extending along an axis 14 perpendicular to the plane of the FIG. 1. As such the detector elements 13 of array 10 will view or "see" a line of predetermined length on the object 12 extending along an axis parallel to axis 14. A lens 15, which may be a series of interconnected lenses, is shown movable along an axis 16 between array 10 and object 12 in the direction shown arrow 17. When properly positioned, lens 15 will focus radiation from object 12 along lines such as shown by reference numerals 20 and 21 in FIG. 1 on the detector array 10. In the prior art, the area viewed by array 10 on object 12 was not visible or otherwise early detectable and in aligning and focusing the system, many readings from the detector array needed to be taken or other complex alignment system had to be used in order to know what area of the object was being "seen".

To overcome this problem, the present invention employs a partly silvered mirror 30 mounted in the path of radiation from object 12 and arranged at an angle to axis 16. An elongated source of radiation 34 which may be a linear filament lamp and which extends along an axis 35 parallel to axis 14 is mounted above mirror 30 at a distance which is optically equivalent to the distance from mirror 30 to array 10. Source 34 is shown connected by conductors 36 and 38 to a series connected energy source 40 and closable switch 42. When switch 42 is closed, energy source 40, which may be a battery, will energize radiation source 34 causing it to emit radiation such as visible light along its axis 35. This radiation is reflected by mirror 30 along axis 16 so as to be focused by lens 15 as a line of radiation shown by dotted line 43 on object 12. This line may be viewed by an operator or otherwise detected so that by moving lens 15 along axis 16 the image is caused to be in good focus. By moving the housing containing lens 15, mirror 30, radiation source 34 and detector array 10, the image 43 of source 34 may be located in a desireable area of object 12. Since the source 34 and array 10 are optically at the same position in the optical system, when the image 43 of source 34 is in focus on object 12, object 12 will be in focus on detector array 10. Also since elongated source 34 is of optically equivalent length to the detectors 13 of array 10, image 43 on object 12 will correspond with the area of object 12 being "seen" by array 10. After the system is thus adjusted, switch 42 may be opened to extinguish lamp 34 and the system will thereafter operate in normal fashion.

Thus it is seen that by unique yet and inexpensive means I have overcome the problems encountered in the prior art, and have provided a system which assures that the area being viewed by a linear array is in proper focus and is correctly positioned. Many changes to the preferred embodiment will occur to those skilled in the art. For example, light source 34 may be an infrared source and may be energized by a modulated alternating energy source 40. The source could be further away from the object if it were enough larger that the image projected onto the object were still the same size as the area being viewed by the sensor. The source could also be replaced by two essentially point or spot sources corresponding to the end points of the line or by a bracket which defined or was descriptive of the area being viewed by the detectors. Also, the linear array 10 could be arranged in the form of a square, or cross or other shape so long as the light source 34 was optically equivalent. I therefore do not wish to be limited by the disclosures used in connection with the preferred embodiment but intend only to be limited by the following claims.

I claim:

1. Apparatus for use with an array of radiation detectors which receive radiation from a remote object, the apparatus operable to provide an indication of the area of the remote object being viewed by the detectors comprising:
- a source of radiation in the form of the array; and
- radiation transmitting means positioned between the detectors and the remote object at a position such that the source is in an optical position descriptive of the position of the array so that radiation from the source is transmitted to form an image on the remote object descriptive of the area; and
- control means to terminate the image on the remote object, the radiation detectors thereafter operable to receive radiation from the area for subsequent operation.

2. Apparatus according to claim 1 wherein the radiation transmitting means includes lens means movable to focus the image on the remote object.

3. Apparatus according to claim 2 wherein the radiation is visible light.

4. Apparatus according to claim 1 wherein the control means includes energization means and switch means connected to the source and operable upon closure and opening of the switch to energize and de-energize the source.

5. Radiation responsive apparatus comprising, in combination:
- a linear array of radiation detectors mounted along a first axis to receive radiation from a remote object;
- a linear radiation source mounted along a second axis substantially parallel to the first axis;
- control means to energize and de-energize the source;
- a partly reflecting mirror mounted between the array and the object so that the array and the source are in optically equivalent positions with respect to the object;
- lens mounted for movement along a line between the array and the object, radiation from the source upon energization being reflected from the mirror and focused by the lens means to produce an image of the radiation on the object at a position descriptive of where radiation from the object through the lens and through the mirror will be received by the detectors, the control means thereafter de-energizing the source and the detectors receiving radiation from the position for subsequent operation.

6. Apparatus according to claim 5 wherein the control means includes switch means and energizing means connected to the source to energize and de-energize the source upon operation of the switch means.

7. Apparatus according to claim 6 wherein the radiation is visible light.

8. An alignment aid for use with a linear detector array which receives radiation from a remote object comprising:
- a partly reflecting mirror positioned between the array and the object;
- control means;
- an elongated radiation source mounted substantially parallel to the array and optically equidistant to the object, the control means operable to energize the source to project an elongated image from the mirror onto the object to show the area being viewed by the array, the control means thereafter de-energizing the source and the array receiving radiation from the area for subsequent operation.

9. Apparatus according to claim 8 further including lens means movable between the object and the mirror to focus the elongated image on the object.

10. Apparatus according to claim 9 wherein the radiation is visible light.

* * * * *